United States Patent [19]

Ishida et al.

[11] Patent Number: 4,893,142
[45] Date of Patent: Jan. 9, 1990

[54] DEVICE FOR ACTIVATING MOTOR-DRIVEN SHUTTER BLADES

[75] Inventors: Hiroaki Ishida; Nobuo Shinozaki; Yasuhiro Nishitani, all of Chiba, Japan

[73] Assignee: Seikosha Co., Ltd., Tokyo, Japan

[21] Appl. No.: 271,800

[22] Filed: Nov. 15, 1988

[30] Foreign Application Priority Data

Nov. 16, 1987 [JP] Japan ............................ 62-174884[U]
Dec. 26, 1987 [JP] Japan ............................ 62-198636[U]
Dec. 26, 1987 [JP] Japan ................................ 62-198637
Dec. 26, 1987 [JP] Japan ............................ 62-198639[U]
Dec. 26, 1987 [JP] Japan ............................ 62-198642[U]

[51] Int. Cl.[4] .............................................. G03B 9/08
[52] U.S. Cl. .................................. 354/234.1; 354/262; 354/265
[58] Field of Search ...................... 354/234.1, 262, 264, 354/265

[56] References Cited

U.S. PATENT DOCUMENTS 4,696,560  9/1987  Ogihara et al. .............. 354/234.1 X
4,782,353 11/1988  Ogihara et al. .................. 354/234.1

Primary Examiner—Michael L. Gellner
Attorney, Agent, or Firm—Jordan and Hamburg

[57] ABSTRACT

A device for activating shutter blades relative to a shutter opening and utilizing a control signal from an electronic circuit includes an electric motor rotatable clockwise and counterclockwise according to a control signal from the electronic circuit, a gear driven by the motor, the gear being located on one side of the shutter opening, fixed pivot axes located on an opposite side of the shutter opening, and a shutter operable device comprising shutter blades pivotable about the fixed pivot axes, the shutter operable device having gear teeth meshing with the gear such that the gear is operable to pivot the shutter blades clockwise and counterclockwise about fixed pivot axes to open and close the shutter opening.

34 Claims, 9 Drawing Sheets

DEVICE FOR ACTIVATING MOTOR-DRIVEN SHUTTER BLADES

BACKGROUND OF THE INVENTION

The present invention relates to a device for activating the shutter blades of a motor-driven shutter in a camera.

A device for activating shutter blades by the use of a motor instead of springs, as is conventional, is installed in a camera equipped with a lens shutter which can vary the focal distance of the lens. Since such a device greatly simplifies the mechanism that interconnects the lens and the body of the camera, it is frequently used. The structure of such devices is known and disclosed in Japanese Laid-Open Patent Publication Nos. 150829/1982 and 57327/1985.

In the structure disclosed in these Japanese patent publications, shutter blades make rectilinear sliding motion and, therefore, at least two support portions are needed to limit the rectilinear sliding motion of the shutter blades. Since a large frictional resistance is produced, the blades are unable to respond quickly to the rotation of the motor. Hence, it is difficult to accurately control the operation of the shutter blades.

In the structure disclosed in the latter Japanese patent publication, shutter blades are driven near their axes of rotation so that there is a high efficiency of operation. However, rattle produced because of the clearances between the components is augmented by the portions of the shutter blades which control the exposure. The shutter blades cannot quickly respond to the rotation of the motor because of the augmented rattle and the moment of inertia in the same way as the aforementioned structure. Consequently, it is difficult to accurately control the operation of the shutter blades.

Especially where shutter blades acting also as a diaphragm are driven by a motor and when subjects are bright, exposure errors are greatly augmented. Special provisions are needed for cameras using a photosensitive material having a narrow latitude. In the structure disclosed in the previously-mentioned Japanese patent publication, the shutter blades effect rectilinear sliding movement such that each component must be disposed nonuniformly around the shutter opening. As a result, the arrangement of the lens of the camera is unusual and singular.

SUMMARY OF THE INVENTION

In view of the foregoing, it is an object of the present invention to provide an inexpensive and small-sized device which activates shutter blades and which has excellent responsiveness.

The above object is achieved in accordance with the teachings of the invention by a device which activates the shutter blades of a motor-driven shutter and comprises blades forming an aperture, teeth formed on the blades, and at least one gear engaging the teeth and driven by a motor, the gear being disposed on the opposite side of the shutter opening from the axes of rotation of the blades.

Another object of the invention is to provide a device which activates motor-driven blades and permits easy adjustment of the phase relation between the motor and the blades.

The above object is achieved by a device for activating motor-driven blades, the device having an electric motor capable of being rotated either forwardly or rearwardly according to a control signal from an electronic circuit, a gear rotated by the motor, a pair of fixed shafts located substantially on the opposite side of a shutter opening from the gear, and a pair of blades held to the shafts so as to be rotatable either forwardly or rearwardly, the gear acting to transmit rotary motion to the blades to open or close the shutter opening, the device comprising: a driving lever having teeth in mesh with the gear, the lever being held to one of the fixed shafts so as to be rotatable either forwardly or rearwardly; a transmission lever mounted to the fixed shaft to which the driving lever is held, the transmission lever being capable of rotating either forwardly or rearwardly, the transmission lever acting to transmit rotary motion from the driving lever to the blades; and an adjusting means mounted between the transmission lever and the driving lever for adjusting the phase relation between the motor and the blades.

Another object of the invention is to utilize a noncontact switch which prevents imperfect contact which might be caused by dust or the like and which removes the mechanical load which might otherwise result.

The above object is achieved by a device for activating motor-driven blades, the device having an electric motor which can be rotated either forwardly or rearwardly according to a control signal from an electronic circuit, a gear driven by the motor, fixed shafts located substantially on the opposite side of a shutter opening from the gear, and blades that are rotated about the fixed shafts either forwardly or rearwardly to open or close the shutter opening, one of the blades having teeth in mesh with the gear. The device is provided with an optical sensor which detects movement of the blades, utilizing the condition in which the teeth obstruct or pass light, and the electronic circuit delivers a control signal for controlling the operation of the motor according to the output signal from the optical sensor.

Another object of the invention to provide a device which activates motor-driven blades, has a transmission system receiving power from a gear rotating with a rotor and made up of a small number of components for reducing mechanical error, and activates a switch at better timing, whereby appropriately controlling the operation of the blades.

The above object is achieved by a device for activating motor-driven shutter blades, the device having an electric motor that can be rotated either forwardly or rearwardly according to a control signal from an electronic circuit, a gear driven by the motor, a fixed shaft located substantially on the opposite side of a shutter opening from the gear, a first blade which has teeth in mesh with the gear and is rotated about the shaft either forwardly or rearwardly to open or close the shutter opening, the device comprising: an idle gear that is in mesh with the first-mentioned gear and rotated by it through an angle less than 360 degrees, the idle gear having a larger diameter and a larger number of teeth than the first-mentioned gear; a second blade which has teeth in mesh with the idle gear and is rotated in a direction opposite to the first blade about a second fixed shaft located substantially on the opposite side of the shutter opening from the first-mentioned gear, the second blade cooperating with the first blade to open or close the shutter opening; and a switch which detects the operation of the blades utilizing the rotation of the idle gear.

A further object of the invention is to provide an economy version of the shutter blade-activating device which is small in size and which has excellent responsiveness.

The above object is achieved by a device for activating motor-driven blades, the device comprising: an electric motor which can be rotated either forwardly or rearwardly according to a control signal from an electronic circuit; a gear driven by the motor; a first fixed shaft located substantially on the opposite side of a shutter opening from the gear, a first blade which has outer teeth in mesh with the gear and can be rotated about the first fixed shaft either forwardly or rearwardly; a second fixed shaft located substantially on the opposite side of the shutter opening from the gear; a second blade which has inner teeth in mesh with the gear and is directed oppositely to the first blade, the second blade being rotated about the second fixed shaft in a direction opposite to the direction in which the first blade is rotated, the first and second blades cooperating to open or close the shutter opening; and a compensating means which compensates for the difference between the distance of the inner teeth meshing with the gear from the center of the shutter opening and the distance of the outer teeth meshing with the gear from the center of the shutter opening to make the change in the area of the aperture formed by the first blade in the center of the shutter opening substantially equal to the change in the area of the aperture formed by the second blade in the center of the shutter opening.

DESCRIPTION OF THE PREFERRED EMBODIMENTS

An embodiment of the invention is hereinafter described with reference to the drawings which show a device for activating motor-driven blades in accordance with the invention.

Figure 1:
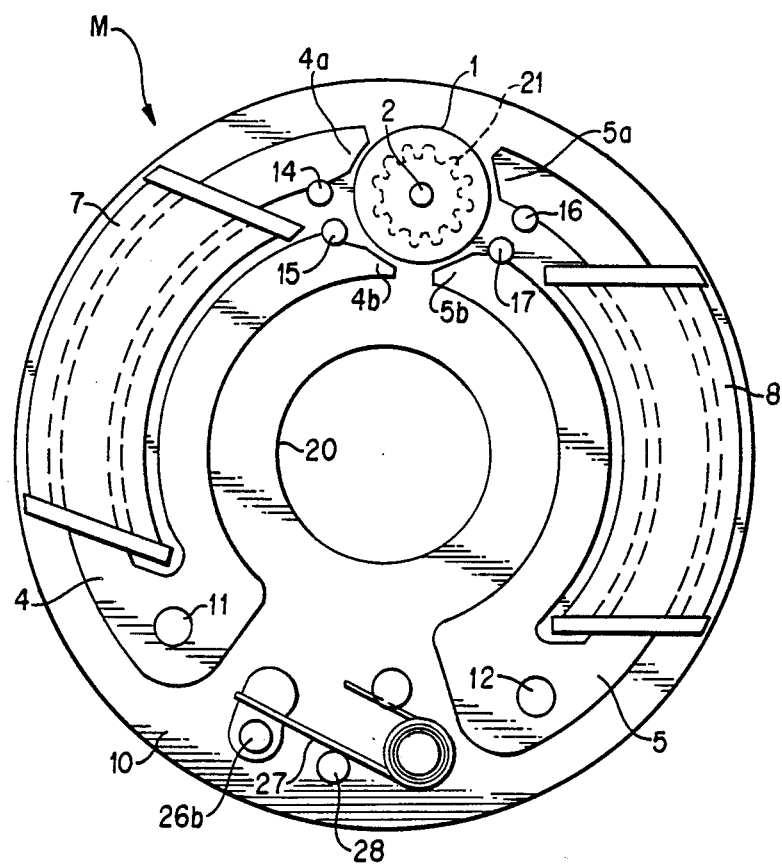
FIG. 1 is an elevational view of a stepper motor used in a device for activating the motor-driven shutter blades shown in FIG. 2.
Figure 2:
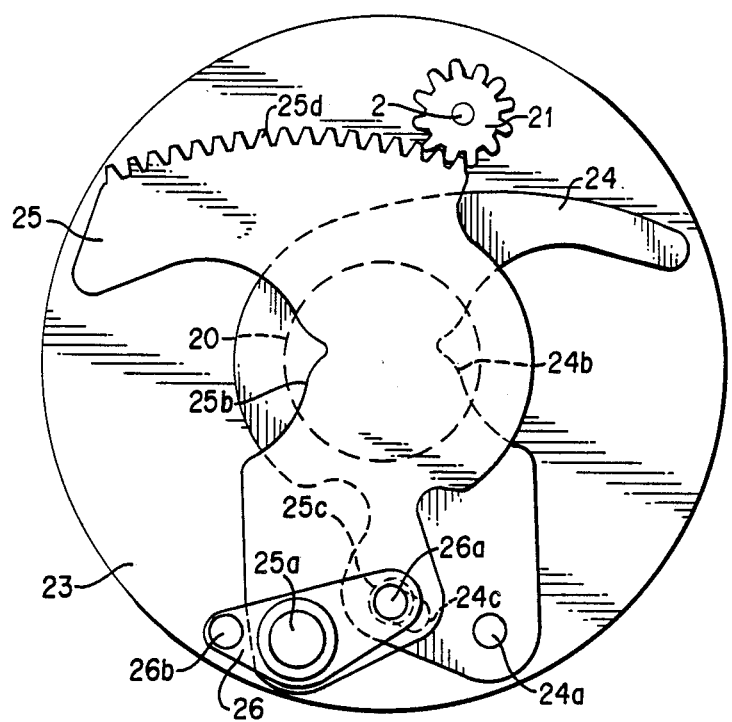
FIG. 2 is an elevational view of one embodiment of the invention showing the position of the shutter blades prior to activation.

Referring to the embodiment of FIGS. 1 and 2, FIG. 1 shows a stepper motor M comprising a rotor 1, two stators 4, 5 having poles 4a, 4b and 5a, 5b, respectively, opposite to the magnetic poles of the rotor 1 and coils 7 and 8 fitted over the stators 4 and 5, respectively. The rotor 1 is held to a shaft 2 so as to be rotatable with it. The rotor 1 consists of a permanent magnet which is circumferentially polarized so as to have plural magnetic poles spaced from each other. The coils 7 and 8 are connected to a known control circuit (not shown).

The stators 4 and 5 are rigidly fixed to a base plate 10 of the motor M by means of mounting shafts 11 and 12, respectively. The positions of the magnetic poles 4a, 4b, 5a, 5b of the stators 4 and 5 which are located opposite to the magnetic poles of the rotor 1 are restricted by pins 14–17, respectively. The base plate 10 of the motor M has a circular configuration. A circular shutter opening 20 is formed in the center of the base plate The shaft 2 holding the rotor 1 extends through the base plate 10 to the rear side of the plate. A gear 21 is held on the front end of the shaft 2 so as to be rotatable with it.

A shutter mount 23 shown in FIG. 2 is mounted rearwardly of the base plate of the motor M. Shutter blades 24 and 25 are disposed between them. Working regions in which the blades can move are formed.

The shutter blade 24 is rotatably held to a fixed shaft 24a and comprises a fringe portion 24b and a groove 24c. The shutter blade 25 is rotatably held to a fixed shaft 25a, and comprises a fringe portion 25b, a groove 25c, and gear teeth 25d in mesh with the gear 21. The fringe portions 24b and 25b cooperate to form an aperture. The shafts 24a and 25a are disposed on the opposite side of the shutter opening 20 from the gear 21.

An opening lever 26 is held to the rear surface of the shutter mount 23 so as to be rotatable about the fixed shaft 25a. A pin 26a extends upward from the lever 26 and is fitted in the grooves 24c and 25c. Another pin 26b extends further upward toward the side of the motor M, protrudes upwardly of the base plate of the motor and is in contact with a switch contact 27. The switch contact 27 is in contact with a contact pin 28 to form a pair of switches which are connected to a control circuit (not shown but described later).

The manner in which the configuration described above operates will now be described. The known control circuit (not shown) operates to deliver signals of two phases, for energizing the two coils 7 and 8 with two polarities. Then the stators 4 and 5 are excited to rotate the rotor 1 and thereby rotate the gear 21 counterclockwise as viewed in FIG. 2. The shutter blade 25 whose teeth mesh with the gear 21 rotates clockwise as viewed in FIG. 2 about the shaft 25a. At this time, the pin 26a is activated by the edge defining the groove 25c to rotate the opening lever 26 also clockwise. As the pin 26a moves the edge defining the groove 24c in the shutter blade 24, the shutter blade 24 is rotated counterclockwise about the shaft 24a.

As the rotor gear 21 continues to rotate counterclockwise, the shutter opening is gradually enlarged by the fringe portions 24b and 25b of the shutter blades 24 and 25 to control the exposure according to the combination of the aperture and the exposure time. When the desired value is reached, the known control circuit delivers signals to the coils 7 and 8 for reversing the rotor 1. Then the rotor 1 is immediately reversed. Subsequently, the gear 21 rotates the shutter blade 25 counterclockwise about the shaft 25a. The blade 25 cooperates with the blade 24 to close the shutter opening 20.

When the opening lever 26 rotates clockwise, the pin 26b activates the switch contact 27 to cause the control circuit to start calculating the exposure value.

Figure 3:
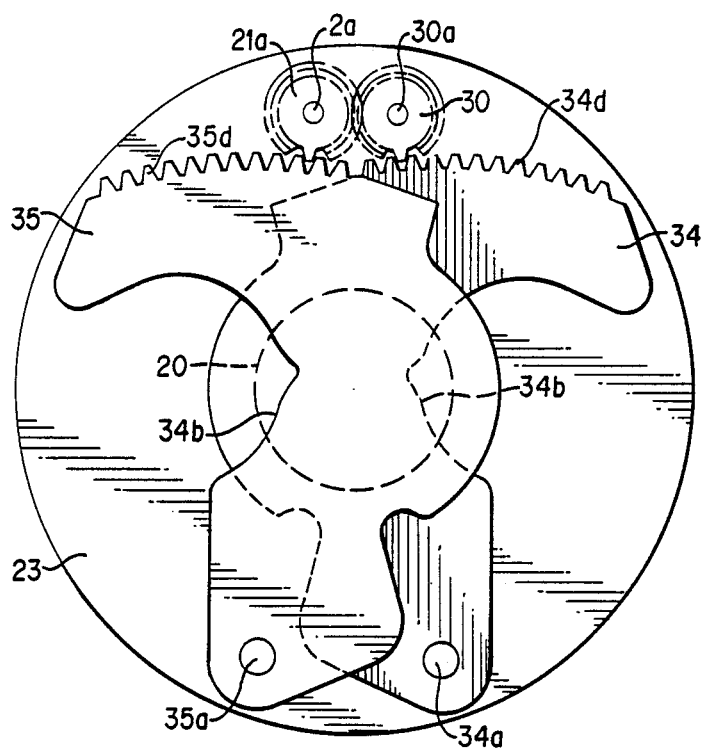
FIG. 3 is an elevational view similar to FIG. 2 but showing another embodiment.

FIG. 3 shows a simplified device for driving the shutter blades. This device does not require the opening lever 26 used in the above example. Like components are indicated by like reference numerals in both FIGS. 2 and 3 followed by a letter suffix. In FIG. 3, a gear 30 which is in mesh with the gear 21a is rotatably held by a shaft 30a firmly fixed to the shutter mount 23. The gear 30 is also in mesh with teeth 34d formed on the shutter blade 34.

When the rotor 1 operates to rotate the gear 21a counterclockwise as shown in FIG. 3, the gear 21a rotates the shutter blade 35 via the teeth 35d clockwise in the same way as in FIG. 2. At the same time, the gear 30 is rotated clockwise. Therefore, the shutter blade 34 whose teeth 34d are in mesh with the gear 30 is rotated counterclockwise. Thus the exposure of the shutter is controlled.

The switch contact 27 shown in FIG. 1 may be designed to be activated by the shutter blades 34, 35 or the gear 21a, 30, or the like in a manner not illustrated but similar to the example shown in FIG. 2.

Figure 4:
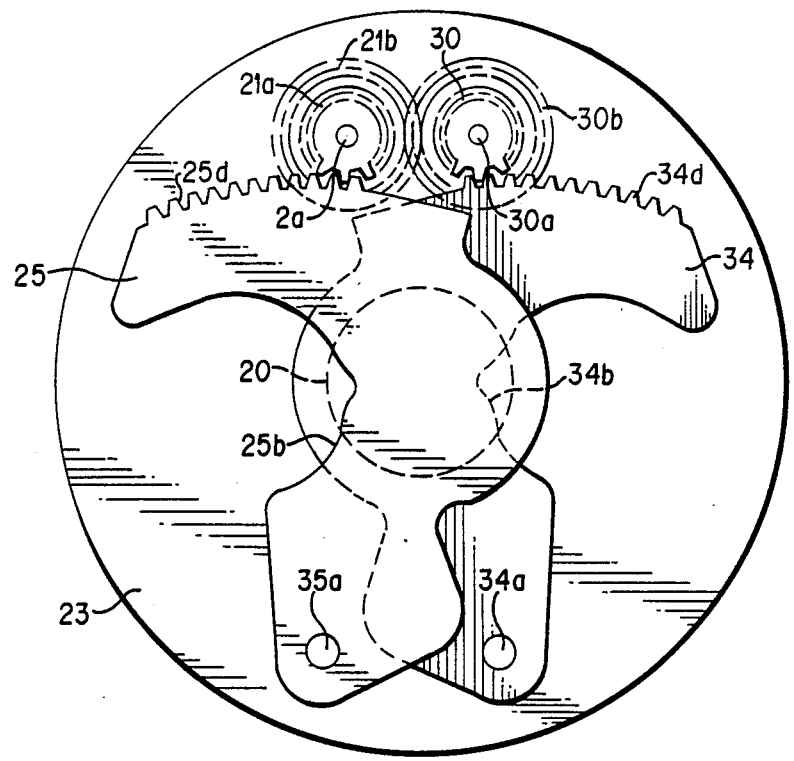
FIG. 4 is an elevational view similar to FIG. 3 but showing a further embodiment.

FIG. 4 shows a structure similar to FIG. 3 except that a larger gear 21b is formed substantially integrally with the gear 21a and another larger gear 30b formed substantially integrally with the gear 30a are provided to give a larger degree of freedom to the arrangement of the shafts 2a and 30a. The gear 21b is in mesh with the gear 30b. This structure operates in the same way as the structure shown in FIG. 3 and so the operation is not described in detail herein.

In the above examples, the motor M is a stepper motor. An ultrasonic motor or other motor which has been put into practical use in recent years and can be rotated either forwardly or reversely according to a control signal from an electronic circuit may also be used.

As can be understood from the above description, the present invention provides a small-sized shutter blade-activating device in which shutter blades are rotatably held to fixed shafts to improve the efficiency of the operation of the shutter blades and the blades show good responsiveness.

Specifically, motor-driven gears are disposed on the opposite side of an opening from the axes of rotation about which the shutter blades are rotated. The gears are in mesh with the teeth formed on the blades. Therefore, the blades are driven at positions the most remote from the axes of rotation of the blades. The effects of the rattle produced by the clearance between engaging parts and the effects of the moment of inertia are reduced. The responsiveness of the device is improved. Further, the exposure can be accurately controlled.

Since the axes of rotation, the motor, and the gears are evenly distributed on opposite sides of the shutter opening, the arrangement of the lens as viewed from the whole camera can be prevented from becoming unusual and singular.

This invention is quite advantageous because the shutter can be shaped into a circular form where the novel device is used in a camera equipped with a lens shutter which varies the focal distance of the lens.

In particular, if the shutter is circular in shape, the clearance between the lens assembly and fixed portions is efficiently filled with parts which can be machined most efficiently. Also, the circularly-shaped shutter is desirable for the manufacturing equipment and reduces the cost of fabrication.

In the above examples, the shutter blades act also as a diaphragm. The invention is also applicable to a device which controls only the aperture.

Another embodiment of the invention will now be described with reference to FIGS. 5 to 7 of the drawings.

Figure 5:
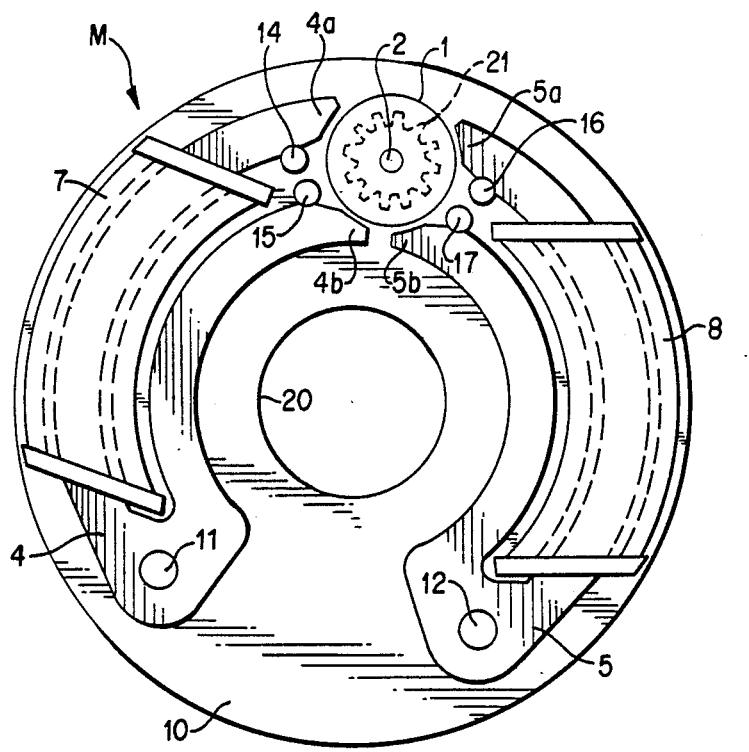
FIG. 5 is a a front elevational view of a stepper motor used in the device for activating the motor-driven shutter blades shown in FIGS. 6–11.

FIG. 5 shows a device similar to FIG. 1 and therefore like numerals have been used in these two Figures. As in FIG. 1, FIG. 5 shows a stepper motor M which comprises the rotor 1, two stators 4, 5 having poles 4a, 4b and 5a, 5b, respectively, opposite to the magnetic poles of the rotor 1 and coils 7 and 8 fitted over the stators 4 and 5, respectively. The rotor 1 is held to the shaft 2 so as to be rotatable with it, the rotor 1 consisting of a permanent magnet which is circumferentially polarized so as to have plural magnetic poles spaced from each other. The coils 7 and 8 are connected to a known control circuit (not shown).

The stators 4 and 5 are rigidly fixed to the base plate 10 of the motor M by means of mounting shafts 11 and 12, respectively. The positions of the magnetic poles 4a, 4b, 5a, 5b of the stators 4 and 5 which are located opposite to the magnetic poles of the rotor 1 are restricted by pins 14-17, respectively. The base plate 10 of the motor M has a circular configuration. A circular shutter opening 20 is formed in the center of the base plate. The shaft 2 holding the rotor 1 extends through the base plate 10 to the rear side of the plate. A gear 21 is held on the front end of the shaft 2 so as to be rotatable with it.

Figure 6:
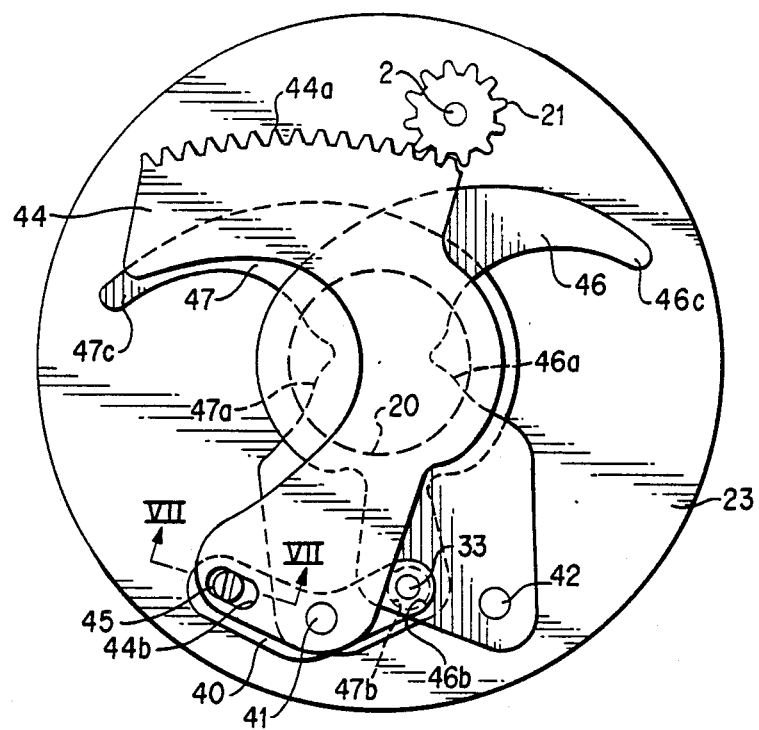
FIG. 6 is an elevational view of the rear side of the base plate of the stepper motor shown in FIG. 5.
Figure 7:
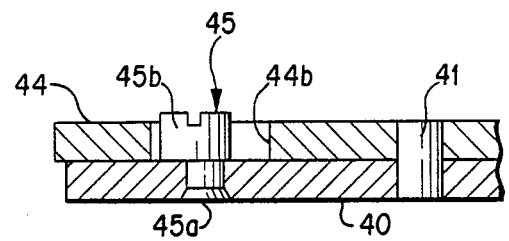
FIG. 7 is a cross-sectional view taken along the line VII—VII in FIG. 6.

Referring to FIG. 6, a shutter mount 23 is spaced a given distance from the rear surface of the base plate 10 of the stepper motor M. A driving lever 44 and shutter blades 46 and 47 are disposed between the base plate 10 and the mount 23 and arranged in this order from the side of the base plate 10. Regions in which the blades 46 and 47 can move are formed around them. FIG. 6 is a front elevation of the blade-activating device as viewed from the rear side of the base plate 10 and in which the base plate 10 of the motor M is omitted.

The shutter blade 47 is rotatably mounted to a fixed shaft 41 which is located substantially on the opposite side of the shutter opening 20 from the gear 21. The blade 47 has a fringe portion 47a and a groove 47b in which an operating pin 33 is fitted. The shutter blade 46 is also rotatably mounted on a fixed shaft 42 that is located substantially on the opposite side of the shutter opening 20 from the gear 21. The blade 46 is provided with a fringe portion 46a which cooperates with the fringe portion 47a to form an aperture. The blade 46 further includes an operating groove 46b in which an operating pin 33 is fitted.

One end of the driving lever 44 is rotatably held to the fixed shaft 41. The lever 44 is similar in shape to the shutter blade 47. The other end of the lever 44 has teeth 44a which are always in mesh with the gear 21. A transmission lever 40 is mounted between the driving lever 44 and the shutter blade 46 in such a way that its intermediate portion is rotatably held to the fixed shaft 41. The operating pin 33 which can engage with the operating grooves 46b and 47b extends upright from one end of the transmission lever 40. As shown in FIG. 7, an adjusting pin (adjusting means) 45 has a reduced portion 45a incompletely crimped against the other end of the lever 40. The adjusting pin 45 further includes an enlarged portion 45b fitted in an adjusting groove 44b formed in the driving lever 44.

The operation of the device will now be described. A known control circuit (not shown) operates to deliver signals of two phases for energizing the two coils 7 and 8 with two polarities. Then the stators 4 and 5 are excited to rotate the rotor 1 in a counterclockwise direction. The gear 21 rotates the driving lever 44 in mesh with the teeth 44a about the fixed shaft 41 in a clockwise direction. At this time, the edge defining the adjusting groove 44b drives the adjusting pin 45 to rotate the transmission lever 30 in the same direction. Therefore, the edge defining the operating groove 46b in the shutter blade 46 is driven by the operating pin 33 so that the blade 46 turns in a counterclockwise direction about the fixed shaft 42 to open the shutter opening 20. Also, the wall defining the operating groove 47b in the shutter blade 47 is driven by the operating pin 33. The blade 47 is rotated in a clockwise direction about the fixed shaft 41 to open the shutter opening 20.

As the rotor 1 continues to rotate in the same direction in this way, the fringe portions 46a and 47a of the shutter blades 46 and 47 gradually open the shutter opening 20. Thus, the exposure is controlled according to the combination of the aperture and the exposure time. When the desired value is reached, the known control circuit delivers signals to the two coils 7 and 8, for reversing the rotor 1. Thus, the rotor 1 is momentarily reversed to cause the gear 21 to rotate the driving lever 44 in a counterclockwise direction about the fixed shaft 41. This rotary motion is transmitted to the fringe portions 46a and 47a of the shutter blades 46 and 47 via the adjusting groove 44b, the adjusting pin 45, the transmission lever 40, the operating pin 33, the operating grooves 46b, 47b to close the shutter opening 20.

Since the reduced portion 45a and the enlarged portion 45b of the adjusting pin 45 are eccentric, it is possible to change the phase relation between the stepper motor M and the shutter blades 46, 47 by inserting a screwdriver or the like into a groove formed in the enlarged portion 45b and rotating it. Consequently, the amount by which the two shutter blades 46, 47 overlap prior to the activation can be changed. Also, the diameter of the aperture can be varied while the shutter is being opened. Hence the amount of the overlap and the diameter of the aperture can be easily maintained constant if the phase relation between the motor and the blades differ among shutters because of the backlash of the engaging gears included in the transmission system which transmits rotary motion from the gear 21 to the shutter blades 46, 47 and because of the accumulation of clearance produced between fitting portions.

The driving lever 44, the shutter blades 46 and 47 overlap with each other such that their orientations are alternately reversed and so when the shutter opening 20 is closed, the geometrical path is bent at many locations and made long. Therefore, light leakage can be effectively prevented. Conversely, if the orientations of the driving lever 44 and the blades are alternately reversed, the amount by which the shutter blades 46 and 47 overlap during the closure can be reduced. The blades 46 and 47 can be reduced in size accordingly. This saves the space occupied by them. The result is that the surrounding components can be laid out with an increased degree of freedom.

In the above example, the shutter blades 46 and 47 are disposed juxtaposed to each other in the direction of thickness of the blades. The driving lever 44 can be mounted between the blades 46 and 47. In this case, the driving lever 44 certainly prevents the front end portions 46c and 47c of the blades from coming into contact with each other and getting entangled when the blades 46, 47 are returning to their original positions after they are opened fully. Therefore, the length of the front end portions 46c and 47c can be shortened, thus saving the space. In addition, the inertia of the blades is reduced. Hence, the responsiveness of the blades can be improved.

Also in the above example, the shutter blades act as a diaphragm. However, in the above example and also in all of the other examples described in this specification, the invention can also be applied to blades which function only as a diaphragm or a shutter.

In the above-described example, the motor is a stepper motor. However, in the above example and also in all of the other examples described in this specification, other motors may be used, such as an ultrasonic motor, provided that it can be controlled at will using a control circuit.

As described in the above embodiment, the amount by which two blades overlap with each other prior to the activation of the device and the diameter of the aperture taken during the operation to open the shutter can be easily adjusted so as to be maintained constant if the phase relation between the motor and the blades varies among shutters because of the backlash of the engaging gears and because of the accumulation of the clearance produced between fitting portions.

Figure 8:
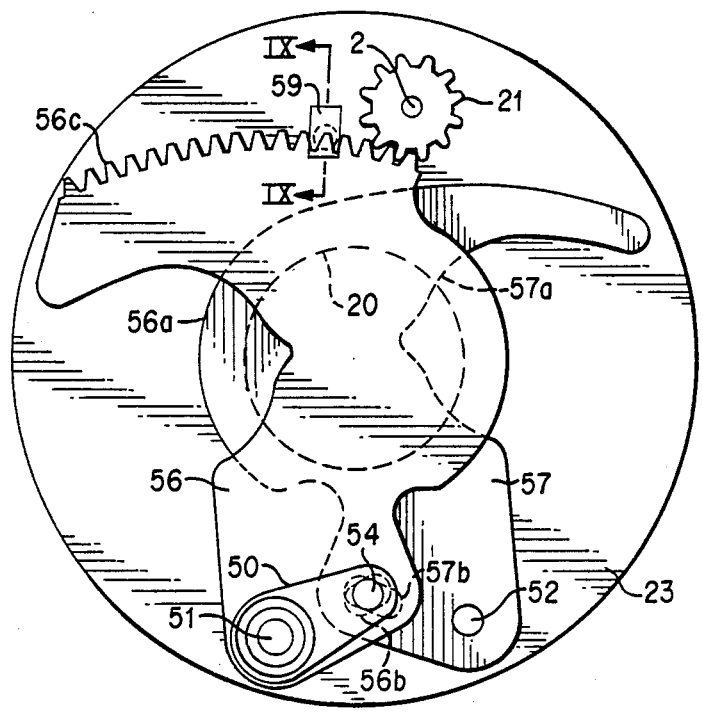
FIG. 8 is an elevational view of the rear side of the base plate of the stepper motor shown in FIG. 5 showing another alternate embodiment.
Figure 9:
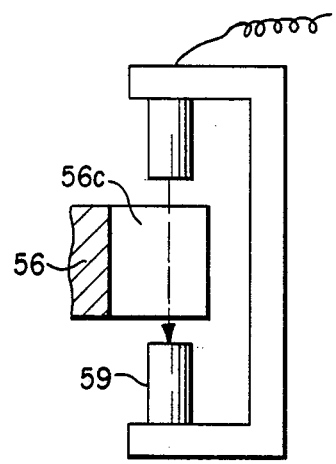
FIG. 9 is a cross-sectional view taken along the line IX—IX in FIG. 8.

FIGS. 8 and 9 show another embodiment in which an optical sensor which detects movement of the blades is utilized. Referring to FIG. 8, a shutter mount 23 is spaced a given distance from the rear surface of the base plate 10 of the stepper motor M. Shutter blades 56 and 57 are disposed between the base plate 10 and the mount 23. Regions in which the blades can move are formed around them. FIG. 8 is a front elevation of the blade-activating device as viewed from the rear side of the base plate 10, and in which the base plate 10 of the motor M is omitted.

A fixed shaft 51 is located substantially on the opposite side of the shutter opening 20 from the gear 21. One end of the shutter blade 56 is held to the shaft 21 in such a way that the blade 56 can rotate either clockwise or counterclockwise. Teeth 56c formed at the other end are always in mesh with the gear 21. The shutter blade 57 is directed oppositely to the blade 56. One end of the blade 57 is held to a fixed shaft 52 that is also located substantially on the opposite side of the shutter opening 20 from the gear 21. The blade 57 can rotate about the shaft 52 either clockwise or counterclockwise. The other end of the blade 57 has no teeth, unlike the blade 56. The blades 56 and 57 have fringe portions 56a and 57a, respectively, which form an aperture. The blades 56 and 57 are further provided with operating grooves 56b and 57b, respectively, in which an operating pin 54 is fitted.

One end of a driving lever 50 is rotatably mounted to the fixed shaft 51. The operating pin 54 extends upright from the other end of the lever 50 and is fitted in the operating grooves 56b and 57b.

As schematically shown in FIG. 9, a photocoupler (optical sensor) 59 is disposed near the teeth 56c of the shutter blade 56 to detect the movement of the blade 56, utilizing the condition that the teeth 56c obstruct or pass light. The output signal from the photocoupler 59 is fed to a known control circuit (not shown).

The operation of the device will now be described. The known control circuit (not shown) operates to deliver signals of two phases for energizing the two coils 7 and 8 with two polarities. Then, the stators 4 and 5 are excited to rotate the rotor 1 in a counterclockwise direction. The gear 21 rotates the shutter blade 56 whose teeth 56c are in mesh with the gear 21 about the fixed shaft 51 in a clockwise direction. At this time, the wall defining the operating groove 56b drives the operating pin 54 to rotate the driving lever 50 is the same direction. Then the blade 57 is driven by the pin 54 fitted in the groove 57b and is rotated about the fixed shaft 52 in a counterclockwise direction. As a result, the fringe portions 56a and 57a of the shutter blades 56 and 57 gradually open the shutter opening 20.

When the gear 21 begins to rotate the shutter blade 56, the teeth 56c which are in mesh with the gear 21 are moved to the right as viewed in FIG. 8. The photocoupler 59 detects the beginning of movement of the blade 56, utilizing the condition in which the teeth 56c obstruct or pass light. The output signal from the photocoupler is fed to the control circuit, which starts its counting operation upon the application of the input signal. This instant of time is regarded as the point at which the blade 56 is started to be driven.

The aperture and the exposure time are calculated from the brightness of the subject. A decision is made based on the number of blockages of light and on the number of passages of light detected by the photocoupler 59, to see whether the blade 56 rotates to make the aperture correspondent with the calculated values. If the desired value is reached, the shutter is opened for an exposure time correspond to the calculated values. Then, the two coils 7 and 8 are energized to reverse the rotor 1. The rotor 1 is momentarily reversed to cause the gear 21 to rotate the blade 56 about the fixed shaft 51 in a counterclockwise direction. The blade 56 cooperates with the blade 57 to close the shutter opening 20.

The output signal from the photocoupler 59 is applied to a certain display device to permit one to easily see whether the blades 56 and 57 are presently operating or at fault.

As described thus far, in accordance with the present invention, teeth formed to transmit power are detected and so the structure is simple. The device does not suffer from imperfect contact which would have been heretofor caused by dust or the like. Therefore, the control operation performed by the novel device is not hindered. Further, the shutter blades can be smoothly operated with high responsiveness, since no mechanical load is applied.

Figure 10:
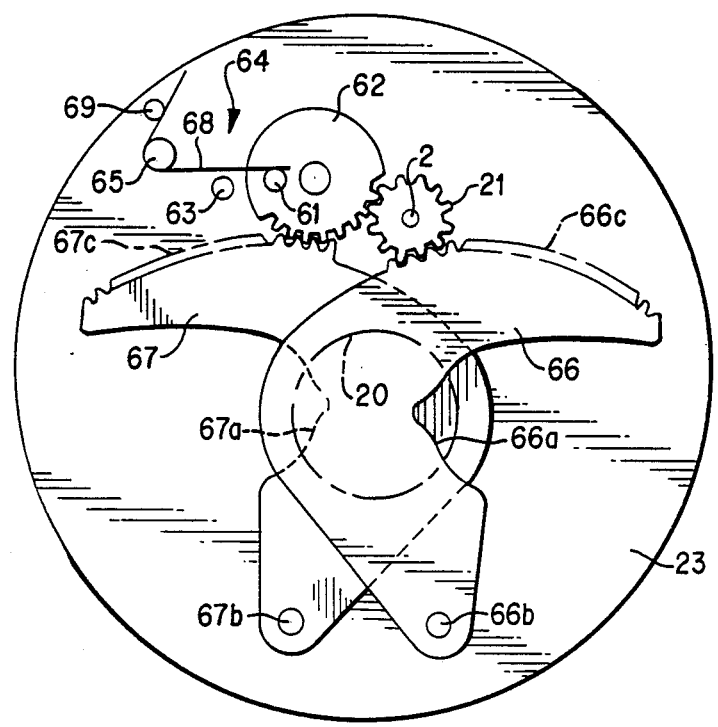
FIG. 10 is an elevational view of the rear side of the base plate of the stepper motor shown in FIG. 5 illustrating a further alternate embodiment.

FIG. 10 shows another embodiment in which a switch is provided which detects the operation of the blades. Referring to FIG. 10, a shutter mount 23 is spaced a given distance from the rear surface of the base plate 10 of the stepper motor M. Shutter blades 66 and 67 are disposed between the base plate 10 and the mount 23. Regions in which the blades can move are formed around them. FIG. 10 is a front elevation of the blade-activating device as viewed from the rear side of the base plate 10 and in which the base plate 10 of the motor M is omitted.

A fixed shaft 66b is located substantially on the opposite side of the shutter opening 20 from the gear 21. One end of the shutter blade 66 is held to the shaft 66b in such a way that the blade 66 can rotate either clockwise or counterclockwise. Teeth 66c formed at the other end are always in mesh with the gear 21. The shutter blade 67 is disposed oppositely to the blade 66. One end of the blade 67 is held to a second fixed shaft 67b that is also located substantially on the opposite side of the shutter opening 20 from the gear 21. The blade 67 can rotate about the shaft 67b either clockwise or counterclockwise. The other end of the blade 67 has teeth 67c like the shutter blade 66. The blades 66 an 67 have fringe portions 66a and 67a, respectively, which form an aperture.

An idle gear 62 which has a larger diameter and a larger number of teeth than the gear 21 is disposed near the teeth 67c of the shutter blade 67 and the gear 21. The idle gear 62 is in mesh with the gear 21 and the teeth 67c. A switch 64 for detecting the operation of the blades 66 and 67, utilizing the rotation of the idle gear 62 is disposed near the idle gear 62. The switch 64 includes a switch contact 68 wound around a fixed shaft 65. The contact 68 has elasticity and conducts electricity. One end of the switch contact 68 is in contact with a contact pin 69. The other end of the switch contact 68 can make resilient contact with a driving pin 61 extending upright from the idle gear 62 and also with a contact pin 63 extending upright from the shutter mount 23.

When the shutter blade 67 is in its fully closed position, the driving pin 61 on the idle gear 62 moves the switch contact 67 away from the contact pin 63. When the blade 67 is rotated to open the shutter, the pin 61 is rotated in a counterclockwise direction to bring the switch contact 68 into contact with the pin 63. The idle gear 62 has more teeth than the teeth 67c of the blade 67. For this reason, the idle gear 62 rotates through an angle less than 360 degrees when the blade 67 is rotated to its fully open position.

The operation of the device will now be described. The known control circuit (not shown) operates to deliver signals of two phases for energizing the two coils 7 and 8 with two polarities. Then the stators 4 and 5 are excited to rotate the rotor 1 in a clockwise direction. Then the gear 21 rotates the shutter blade 66 in mesh with the teeth 66c about the fixed shaft 66b in a counterclockwise direction. At this time, the gear 21 drives the idle gear 62 in a counterclockwise direction. The idle gear 62 rotates the blade 67 whose teeth 67c are in mesh with the gear 62 in a clockwise direction. Thus, the fringe portions 66a and 67a of the blades 66 and 67 gradually open the shutter opening 20.

When the gear 21 begins to rotate the idle gear 62, the driving pin 61 turns in a counterclockwise direction to bring the switch contact 68 into contact with the contact pin 63. This activates the switch 64 which then delivers a signal to the control circuit (not shown). This signal is used as a reference for the starting point or for a counting operation. Since the idle gear 62 rotates within 360 degrees, the driving pin 61 will not make one complete revolution and again make contact with the switch contact 68 to damage the contact 68.

After the shutter opening 20 has been opened, the exposure is controlled according to the combination of the aperture and the exposure time, using the aforementioned signal as a reference. When the desired value is reached, the known control circuit produces signals to the two coils 7 and 8 to reverse the rotor 1. The rotor 1 is then momentarily reversed. The gear 21 rotates the shutter blades 66 and 67 about the fixed shafts 66b and 67b, respectively, to close the shutter opening 20. At this time, the idle gear 62 returns to the illustrated original position. The driving pin 61 moves the switch contact 68 away from the contact pin 63 to deactivate the switch 64.

In this way, the switch 64 can be activated from the idle gear 21 via only one member, i e., the idle gear 62. The produced mechanical error can be reduced as compared with the error produced in the conventional device. The blades can be adequately controlled at more precise timing.

As described above, there is provided a device which activates motor-driven blades and has a transmission system receiving power from a gear rotating with a rotor and consisting of a small number of components, thus reducing mechanical error. The device activates a switch at more precise timing, whereby appropriately controlling the operation of the blades.

Figure 11:
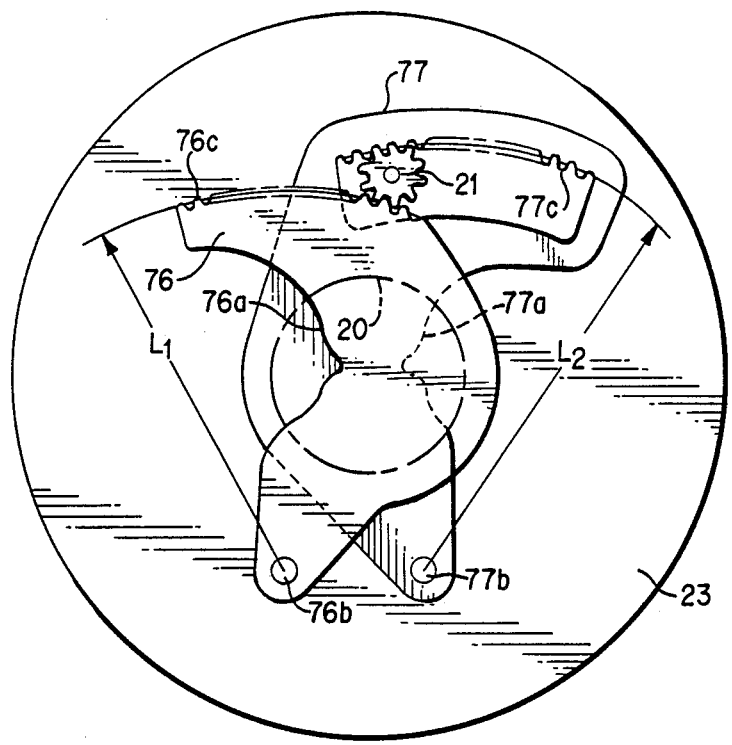
FIG. 11 is an elevational view of the rear side of the base plate of the stepper motor shown in FIG. 5 illustrating yet another alternate embodiment.

FIG. 11 shows a further embodiment in which a compensating means is provided. Referring to FIG. 11, a shutter mount 23 is spaced a given distance from the rear surface of the base plate 10 of the stepper motor M. Shutter blades 76 and 77 are disposed between the base plate 10 and the mount 23. Regions in which the blades can move are formed around them. FIG. 11 is a front elevation of the blade-activating device as viewed from the rear side of the base plate 10, and in which the base plate 10 of the motor M is omitted.

A first fixed shaft 76b is located substantially on the opposite side of the shutter opening 20 from the gear 21. One end of a first shutter blade 76 is held to the shaft 76b so as to be rotatable either clockwise or counterclockwise. Outer teeth 76c which are always in mesh with the gear 21 are formed at the other end of the blade 76. A second shutter blade 77 is directed oppositely to the blade 76. One end of the blade 77 is mounted to a second fixed shaft 77b so as to be rotatable either clockwise or counterclockwise. The shaft 77b is also located substantially on the opposite side of the shutter opening 20 from the gear 21. Inner teeth 77c which are kept in mesh with the gear 21 are formed at the other end of the blade 77. The blades 76 and 77 are provided with fringe portions 76a and 77a, respectively, which form an aperture.

Since the outer teeth 76c of the blade 76 mesh with the gear 21 while rotating about the fixed shaft 76b, the center of the pitch circle of the outer teeth 76c lies at the center of the shaft 76b. The radius of the pitch circle is the distance $L_1$ between the pitch circle and the center of the shaft 76b. The inner teeth 77c of the blade 77 also mesh with the gear 21 while rotating with the fixed shaft 77b and, therefore, the center of the pitch circle of the inner teeth 77c is situated at the center of the shaft 77b. The radius of this pitch circle is the distance $L_2$ between the pitch circle and the center of the shaft 77b. The distance $L_1$ is set equal to the distance $L_2$.

The operation of the device will now be described. The known control circuit (not shown) operates to deliver signals of two phases for energizing the two coils 7 and 8 with two polarities. Then, the stators 4 and 5 are excited to rotate the rotor 1 in a clockwise direction. The gear 21 rotates the shutter blade 76 in mesh with the teeth 76c about the fixed shaft 76b in a clockwise direction.

At the same time, the gear 21 rotates the shutter blade 77 whose inner teeth 77c are in mesh with the gear 21 about the shaft 77b in a counterclockwise direction so that the fringe portions 76a and 77a of the blades 76 and 77 gradually open the shutter opening 20.

Although the blades 76 and 77 are rotated by the same gear 21 simultaneously, in this way they move toward or away from each other at the same speed, because the radius $L_1$ of the pitch circle of the outer teeth 76c is equal to the radius $L_2$ of the pitch circle of the inner teeth 77c. Therefore, the amounts of movement made on opposite sides of the shutter opening 20 do not differ. Consequently, the blades 76 and 77 are prevented from angularly moving through different angles, or if they move through different angles, the effects of the inequality between the two amounts of movement can be eliminated.

The exposure is controlled according to the combination of the aperture and the exposure time. When the desired value is reached, the known control circuit delivers signals to the two coils 7 and 8, for causing the coils to reverse the rotor 1. Then the rotor 1 is momentarily reversed. The gear 21 rotates the blades 76 and 77 about the shafts 76b and 77b, respectively, to close the shutter opening 20.

Also in the above example, the radius $L_1$ of the pitch circle of the outer teeth 76c of the shutter blade 76 is set equal to the radius $L_2$ of the pitch circle of the inner teeth 77c of the shutter blade 77, but this is not essential to the present invention. The fixed shafts 76b and 77b may be located at positions which are close to each other but renders the difference between the two amounts of movement practically acceptable. The inequality between the two amounts of movement made by the blades 76 and 77 makes the shape of the aperture asymmetric, and renders the changes in the areas of the apertures formed near the center of the opening by the blades different. To accommodate these asymmetric factors, the fringe portions 76a and 77a may be made different in shape.

Further in the above example, the fixed shafts 76b and 77b are located at different positions. These two shafts may be located at the same position and made common. Also in this case, the fringe portions 76a and 77a may be made different in shape to compensate for the asymmetry of the shape of the aperture caused by the inequality between the amounts of movement made by the blades 76 and 77, as well as for the inequality between the changes in the areas of apertures created by the blades. Consequently, the effects of the inequality between the amounts of movement made by the blades 76 and 77 can be reduced.

As can be understood from the description, in the novel device for activating motor-driven blades, the blades are rotatably held to fixed shafts to improve the efficiency of the operation of the blades, but the responsiveness of the device is good. Further, the device is small in size.

In particular, a gear driven by a motor is located on the opposite side of a shutter opening from the axes of rotation of the blades. Teeth formed on the blades are in mesh with the gear. Therefore, the blades can be driven at the positions remotest from the axes of rotation of the blades. As such, the effects of the rattle produced by the clearances between fitting portions and the effects of inertia are reduced. Hence, the responsiveness of the device is good. The device permits the exposure to be controlled accurately.

Since the axes of rotation, the motor, and the gear are evenly distributed to opposite sides of the shutter opening, the arrangement of the lens as viewed from the whole camera can be prevented from becoming singular. Also, the device is made up of a lesser number of components. Hence, the cost can be minimized.

Additionally, the two shutter blades move toward or away from each other at the same speed, because the radius of the pitch circle of the outer teeth of one shutter blade is equal to the radius of the pitch circle of the inner teeth of the other shutter blade. Consequently, the shutter opening will not be closed or opened in an asymmetrical manner resulting in a decrease in the accuracy.

Another advantage arises from the fact that the two shutter blades are driven directly by one gear. That is, the shutter opening can be opened and closed quickly. Further, the responsiveness is improved.

What we claim is:

1. A device for activating shutter blades relative to a shutter opening and utilizing a control signal from an electronic circuit comprising:
    an electric motor rotatable clockwise and counterclockwise according to a control signal from said electronic circuit;
    a gear means driven by said motor, said gear means being located on one side of said shutter opening;
    fixed axis means located on an opposite side of said shutter opening opposite to said one side; and
    shutter operable means comprising shutter blades pivotable about said fixed axis means, said shutter operable means having gear teeth meshing with said gear means such that said gear means is operable to pivot said shutter blades clockwise and counterclockwise about said axis means to open and close said shutter opening.

2. A device according to claim 1, wherein said gear means and said fixed axis means are spaced from said shutter opening and are disposed on opposite sides of a diametric line passing through the center of said shutter opening.

3. A device according to claim 1, wherein said gear teeth are arranged on one of said shutter blades, said shutter operable means being interconnected between said one and another shutter blade such that pivoting of said one shutter blade effects pivoting of said other shutter blade.

4. A device according to claim 1, wherein said shutter operable means comprises a driving lever, said gear teeth being on said driving lever, said driving lever being operable to pivot said shutter blades clockwise or counterclockwise as said gear means drives said driving lever.

5. A device according to claim 1, wherein said fixed axis means comprises two spaced pivot shafts with each pivot shaft pivotably supporting a shutter blade, said gear teeth being on one of said shutter blades, said shutter operable means further comprising operable interconnecting means which operably interconnect said two shutter blades such that when said one shutter blade is pivoted in one direction by said gear means, the other shutter blade pivots in an opposite direction.

6. A device according to claim 5, wherein said operable interconnecting means comprises an opening lever pivotal about one of said pivot shafts, said opening lever being pivotal by said one shutter blade to effect pivoting of said other shutter blade.

7. A device according to claim 6 further comprising a switch means actuated by said opening lever upon pivoting of said opening lever.

8. A device according to claim 1, wherein said gear means comprises a first gear driven by said motor and a second gear driven by said first gear, said shutter blades each having gear teeth such that said first gear engages the gear teeth on one shutter blade to pivot the latter and said second gear engages the gear teeth on the other shutter blade to pivot the latter.

9. A device according to claim 8, wherein said first gear has a first set of gear teeth engaging the gear teeth of said one shutter blade and another set of teeth engaging said second gear, said second gear having one set of gear teeth engaging said first gear and another set of teeth engaging the gear teeth on said other shutter blade.

10. A device according to claim 1 further comprising phase adjusting means for adjusting the phase relation between said motor and said shutter blades.

11. A device according to claim 4, wherein said fixed axis means comprises two spaced pivot shafts with each pivot shaft pivotably supporting a shutter blade, said shutter operable means further comprising a transmission lever pivotal about one of said pivot shafts, said gear means being operable to pivot said driving lever which in turn pivots said transmission lever which in turn pivots said two shutter blades in opposite directions.

12. A device according to claim 11 further comprising phase adjusting means between said driving lever and said transmission lever for adjusting the phase relation between said motor and said shutter blades.

13. A device according to claim 11, wherein said transmission lever has one connecting means operatively connected to said two shutter blades and another connecting means operatively connected to said driving lever, said other connecting means comprising a pin mounted on said transmission lever, and an opening in said driving lever, said pin having an eccentric extension extending into said opening such that rotation of said pin adjusts the phase relation between said motor and said shutter blades.

14. A device according to claim 1 further comprising optical sensor means for detecting movement of said shutter blades.

15. A device according to claim 14, wherein said gear teeth comprise a plurality of spaced gear teeth, said optical sensor means being disposed to detect the optical variations between said gear teeth and the spaces between said gear teeth.

16. A device according to claim 14, wherein said optical sensor means provides a control signal for controlling said motor.

17. A device according to claim 14, wherein said optical sensor means provides a control signal for determining the beginning of pivotal movement of said shutter blades.

18. A device according to claim 14, wherein said optical sensor means provides a signal to determine the operating conditions of said shutter blades.

19. A device according to claim 1 further comprising a switch means actuated by said gear means for detecting the pivotal movement of said shutter blades.

20. A device according to claim 19, wherein said switch means comprises an idle gear driven by said gear means, and an actuatable switch means actuated by said idle gear.

21. A device according to claim 20, wherein said idle gear comprises a driving member, said actuatable switch means comprising a fixed contact member and a movable contact member such that rotation of said idle gear by said gear means moves said driving member which in turn moves said movable contact member relative to said fixed contact member.

22. A device according to claim 20, wherein there are two of said shutter blades each having gear teeth, said gear means meshing with the gear teeth on one of said shutter blades, said idle gear meshing with the gear teeth on the other of said shutter blades.

23. A device according to claim 1, wherein said fixed axis means comprises a first and second pivot shaft pivotably supporting a first and second shutter blade respectively, said first shutter blade having outer gear teeth meshing with one side of said gear means at a first meshing location, said second shutter blade having inner gear teeth meshing with an opposite side of said gear means at a second meshing location such that rotation of said gear means effects rotation of said shutter blades in opposite directions, said inner and outer gear teeth being spaced from said shutter opening, and compensating means for compensating for the difference between the distance of said first meshing location from the center of said shutter opening and the distance of said second meshing location from the center of the shutter opening to thereby make the change in the area of the aperture formed by said first shutter blade in the center of the shutter opening substantially equal to the change in area of the aperture formed by said second shutter blade in the center of said shutter opening.

24. A device according to claim 1, wherein said fixed axis means comprises a first and second pivot shaft pivotably supporting a first and second shutter blade respectively, said first shutter blade having first gear teeth arranged along a first pitch circle disposed a first radial distance from said first pivot shaft, said second shutter blade having second gear teeth arranged along a second pitch circle disposed a second radial distance from said second pivot shaft, said first gear teeth being disposed on one side of said gear means, said second gear teeth being disposed on the opposite side of said gear means.

25. A device according to claim 24, wherein said first and second radial distances are substantially equal.

26. A device according to claim 24, wherein said first and second pivot shafts have pivot axes which are spaced from one another.

27. A device according to claim 24, wherein said first and second pivot shafts each has a common pivot axis.

28. A device according to claim 24, wherein said first shutter blade has a first outer edge portion, said first gear teeth being disposed along said first outer edge portion, said second shutter blade having a second edge portion with an elongated opening disposed radially inwardly of said second edge portion, said opening being defined partially by an inner edge, said second gear teeth being disposed along said inner edge.

29. A device according to claim 24, wherein said gear means comprises a drive gear rotatable about a drive shaft, the gear teeth of said first pitch circle being disposed between said first pivot shaft and said drive shaft, the gear teeth of said second pitch circle being disposed radially outwardly of a radial line extending from said second pivot shaft and passing through said drive shaft.

30. A device according to claim 24, wherein said shutter blades have fringe portions which traverse said shutter opening when said shutter blades open and close said shutter opening, the fringe portions of each shutter blade each having a different configuration.

31. A device according to claim 1, wherein said fixed axis means comprises a first and second pivot shaft pivotably supporting a first and second shutter blade respectively, said first shutter blade having gear teeth disposed along a first pitch circle disposed a first radial distance from said first pivot shaft, said second shutter blade having gear teeth disposed along a second pitch circle disposed a second radial distance from said second pivot shaft, said first radial distance being substantially equal to said second radial distance.

32. A device for activating shutter blades relative to a shutter opening and utilizing a control signal from an electronic circuit comprising: an electric motor rotatable clockwise and counterclockwise according to a control signal from said electronic circuit;
 a gear means driven by said motor, said gear means being located on one side of said shutter opening;
 fixed axis means located on an opposite side of said shutter opening opposite to said one side; and
 shutter blades pivotable about said fixed axis means, at least one of said shutter blades having gear teeth meshing with said gear means such that said gear means is operable to pivot said at least one shutter blade clockwise and counterclockwise about said axis means to effect opening and closing of said shutter opening by said shutter blades.

33. A device for activating shutter blades relative to a shutter opening and utilizing a control signal from an electronic circuit comprising:
 an electric motor rotatable clockwise and counterclockwise according to a control signal from said electronic circuit;
 a gear means driven by said motor, said gear means being located on one side of said shutter opening;
 fixed axis means located on an opposite side of said shutter opening opposite to said one side; and
 shutter operable means comprising a driving gear and shutter blades pivotable about said fixed axis means, said driving gear having gear teeth meshing with said gear means such that said gear means pivots said driving gear to thereby pivot said shutter blades clockwise and counterclockwise about said axis means to open and close said shutter opening.

34. A device according to claim 33, wherein said shutter operable means comprises phase adjusting means for adjusting the phase relation between said motor and said shutter blades.

* * * * *